United States Patent [19]

Beere

[11] Patent Number: 5,358,228

[45] Date of Patent: Oct. 25, 1994

[54] VISE HAVING AN INVERTIBLE V-BLOCK

[75] Inventor: Richard F. Beere, Waterford, Wis.

[73] Assignee: Beere Tool Company, Inc., Racine, Wis.

[21] Appl. No.: 116,706

[22] Filed: Sep. 7, 1993

[51] Int. Cl.⁵ .............................................. B25B 5/04
[52] U.S. Cl. .................................. 269/244; 269/279; 269/902
[58] Field of Search .............. 269/279, 902, 282, 283, 269/244, 249, 268; 409/225, 219, 903; 51/220, 216 R, 216 A, 217 R, 217 A; 408/72; 33/573

[56] References Cited

U.S. PATENT DOCUMENTS

| | | |
|---|---|---|
| 713,739 | 11/1902 | Yates . |
| 1,071,289 | 8/1913 | Bader . |
| 1,415,855 | 5/1922 | Anderson ............................ 269/279 |
| 2,371,831 | 3/1945 | Leming ............................... 269/902 |
| 2,472,040 | 5/1949 | Brookfield . |
| 2,492,558 | 12/1949 | Deubler, Jr. . |
| 2,515,877 | 7/1950 | Keller . |
| 3,218,059 | 11/1965 | Andrew . |
| 4,005,945 | 2/1977 | Gutman . |
| 4,854,568 | 8/1989 | Baeza et al. ........................ 269/902 |
| 5,172,896 | 12/1992 | Beere . |

Primary Examiner—Robert C. Watson
Attorney, Agent, or Firm—Arthur J. Hansmann

[57] ABSTRACT

A vise having a base piece and an invertible V-block supported both laterally and downwardly on the base piece in either inverted position. A movable jaw operates toward and away from the V-block in distances in accord with the inverted position of the V-block, all to accommodate workpieces of different sizes and with only one invertible V-block which is snugly supported in lateral positions on the base piece and which is supported upwardly by shouldering on the base piece.

16 Claims, 1 Drawing Sheet

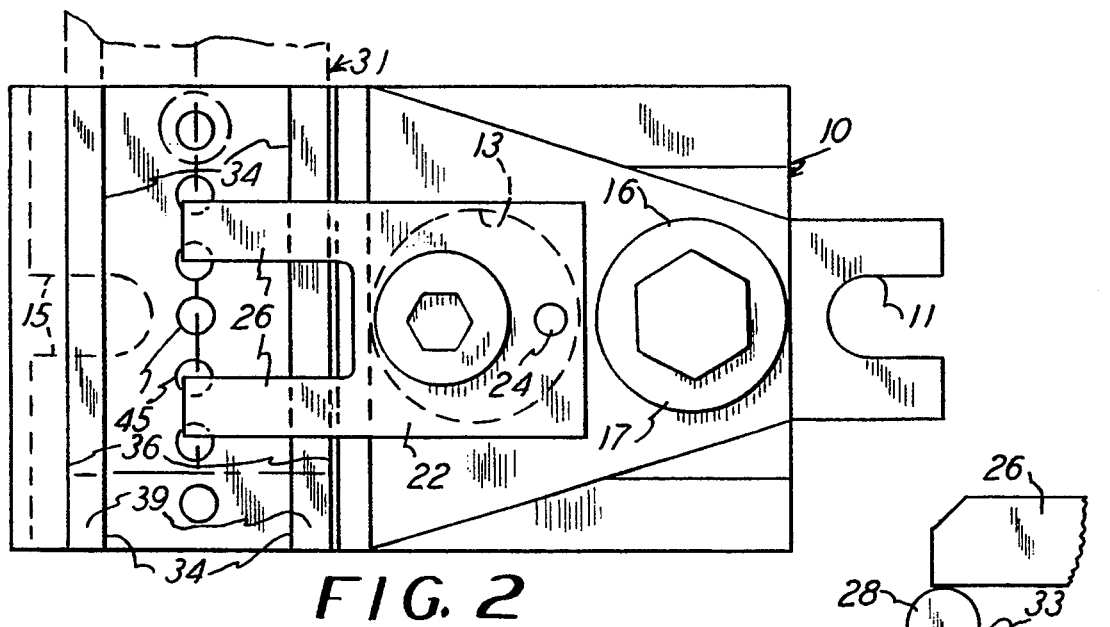
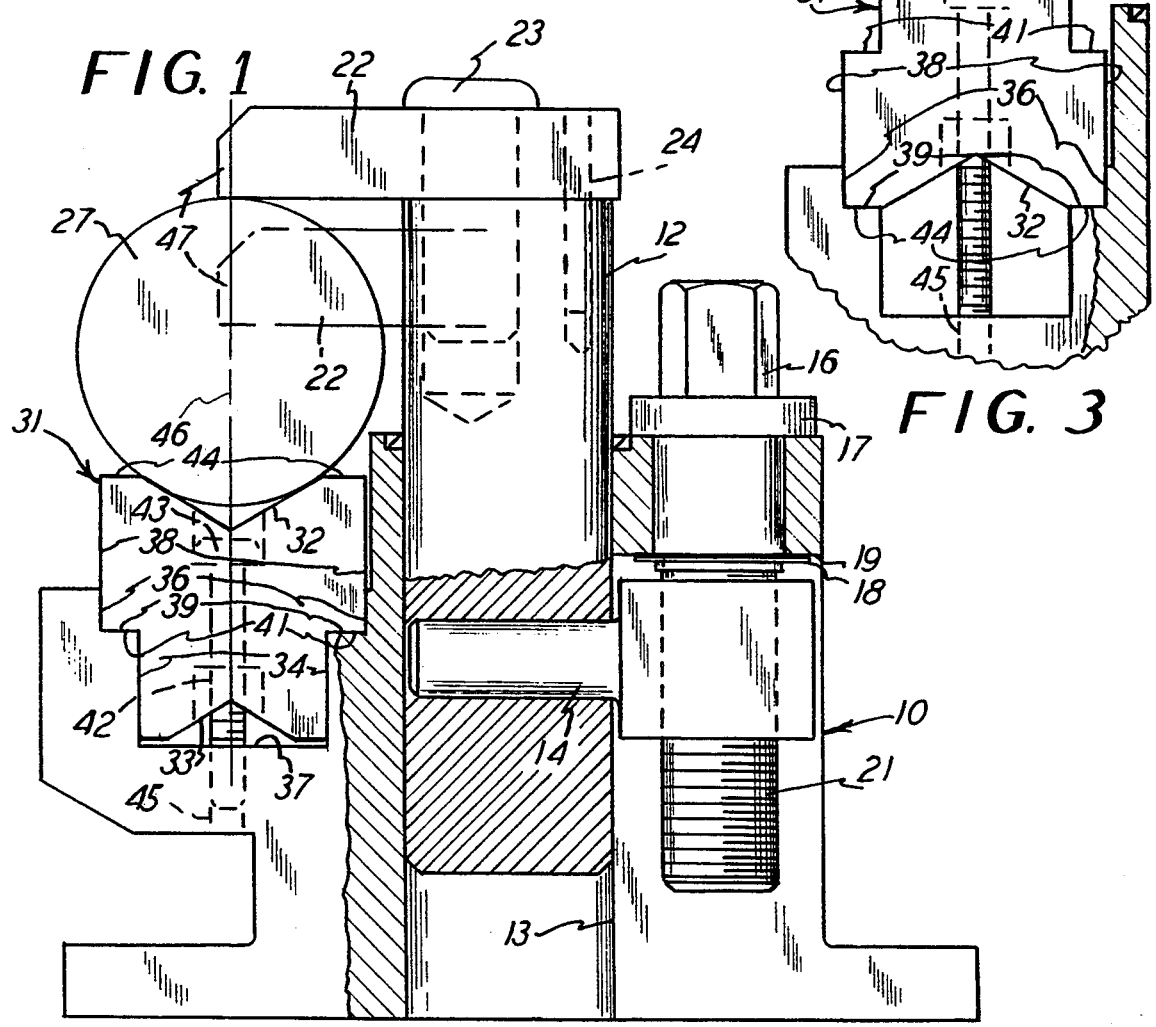

VISE HAVING AN INVERTIBLE V-BLOCK

This invention relates to a vise having an invertible V-block.

BACKGROUND OF THE INVENTION

The prior art is already aware of various configurations of vises which are used in industrial environments for purposes of holding workpieces which can be machined while being held. The type of vise under consideration is generally that which includes a V-block mounted on a support base and having a movable jaw which moves toward and away from the V-block for purposes of clamping a workpiece between the V-block and the movable jaw. The V-block of course has a V-groove for the nesting of the workpiece which is generally cylindrical in shape.

U.S. Pat. Nos. 2,472,040 and 2,492,558 and 2,515,877 and 5,172,896 and 4,005,945 all show vises which have V-blocks with a movable jaw for pressing a workpiece into the V-groove of the V-block. However, these vises do not have a reversible type of V-block which is the subject of the present invention.

U.S. Pat. Nos. 1,071,289 and 3,281,059 both show vises with reversible V-blocks which have V-grooves of different sizes therein. Those two prior art showings do not disclose a vise with an invertible V-block which is flanked on opposite sides by the base piece, for alignment and security, and which shoulders on the base piece for supporting the block and its workpiece against the force of working. Still further, those prior art showings differ from the present invention in that they do not inter-relate the base piece and an invertible V-block such that the two different V-grooves shoulder different manners on the one base piece of the vise for presenting the two different grooves at different locations relative to the movable jaw. That is, in the present invention, the movable jaw can have its linear displacement for moving toward and away from the workpiece, and that displacement accommodates the respective size of the V-groove which is at that time presented to the movable jaw. In that manner, the present invention provides for accommodation of workpieces from one-half inch up to two inches, but simply by utilization of only one V-block which is invertible and there is still clearance between the V-block and the movable jaw for purposes of receiving the two inch diameter workpiece, for example.

That is, the present invention provides a vise which has the base piece for mounting onto a machine or work support or the like and which has the movable jaw with actuator means inter-related between the base piece and the movable jaw and then which also has the invertible V-block supportable on the base piece in two different positions to present two different V-grooves faced toward the movable jaw for accommodating workpieces of different sizes.

BRIEF DESCRIPTION OF THE DRAWINGS

FIG. 1 is a side elevational view, partly broken away, showing the vise of this invention with a large workpiece supported therein.

FIG. 2 is a top plan view of FIG. 1 and showing a fragment of the V-block in dot-dash lines.

FIG. 3 is a side elevational view, similar to FIG. 1, and showing the vise in the inverted position for accommodating a smaller workpiece shown in the vise.

DETAILED DESCRIPTION OF THE PREFERRED EMBODIMENT

Base piece 10 has a flat lower portion which has the usual two bolt slots 11 and 15 for bolting the entire vise on a workbench or machine table or the like. In the FIG. 1 position, the vise is shown to be in the upright position, and it has a cylindrically-shaped ram 12 which moves up and down in a cylindrical opening 13 in the base 10. The moving actuator is a finger 14 which extends into the ram 12 and which is disposed in an opening in the base 10 and is engaged by a screw 16 trapped in the base 10 by means of the screw head 17 bearing downwardly on the base 10 and the washers 18 which are on the screw 16 and bear upwardly on the base surface 19. Accordingly, the screw 16 has a threaded end 21, and upon rotation of the screw 16, it threadedly engages with the finger 14 to move the finger 14 up and down and thus move the ram 12 up and down.

A U-shaped jaw 22 is attached to the ram 12 by means of the screw 23, and a pin 24 extends between the jaw 22 and the ram 12 to thereby keep the jaw 22 in alignment relative to the finger 14 and the ram 12. FIG. 2 shows that the jaw 22 has two fingers 26 spaced apart and extending over the vertical plane of the workpiece 27, as shown in FIG. 1 and also over the workpiece 28, as shown in FIG. 3. At this time it will also again be mentioned that the workpiece 27 may be of a cylindrical configuration and a two inch diameter, and the workpiece 28 is also cylindrical and of a half inch diameter, but both workpieces are accommodated in the vise of this invention though only one V-block is required.

The aforementioned is similar to U.S. Pat. No. 3,306,604 with regard to the base piece and the finger 14 and the actuator screw 16 and the ram 12 and the movable jaw 22. Also, there is similarity with regard to applicant's prior U.S. Pat. No. 5,172,896 relative to the base piece and the screw-actuated movable jaw which operates against a V-block.

The essence of this invention resides in the provision of an invertible V-block 31 which can be positioned in either the FIG. 1 or the FIG. 3 position and which is supported on the base piece 10 in both the downward direction and the two lateral directions when the V-block is in either of the two inverted positions. Of course the V-block has the two different size V-grooves 32 and 33 which respectively accommodate the larger workpiece 27 and the smaller workpiece 28 and thus position the workpieces in the appropriate position relative to the distance from the movable jaw 22 when the jaw is in its lowered and clamping position, as shown in the respective FIGS. 1 and 3. The base piece 10 has a slot therein which is defined by the two upright and parallel walls 34 and the two upright and parallel walls 36 and also by the lower base surface 37. The V-block 31 has two sidewalls 38 which are spaced-apart at a distance comparable to the spacing of the surfaces 36 of the base piece to thus be in sliding and snug fit with the surfaces 36, that is, the spacing of the surfaces 38 is comparable or equal to that of the spacing of the surfaces 36. Accordingly, the V-block is snugly supported laterally on the base piece and cannot move thereon because of the sliding snug fit between the surfaces 36 and 38.

Also, the base piece has upwardly facing shoulders 39, and the V-block 31, in the FIG. 1 position has downwardly facing shoulders 41 which bear downwardly on the base piece shoulders 39 to thus support the V-block 31 upwardly on the base piece.

In that arrangement in FIG. 1, the V-block 31 is completely secured relative to the base piece so that there is no movement of the V-block 31 in either the lateral or downward position in the relationship shown in FIG. 1, and the larger V-groove 32 is presented upwardly.

Further, the V-block 31 has a bolt hole 42 extending therethrough, and a bolt 43 extends through the V-block bolt hole 42 and threads into the base piece 10 at a selected one of the threaded openings 45 of FIG. 1. In that arrangement, seen in FIG. 2 the V-block 31 can be shifted along the base piece slot 37, such as the indicated shifting of the V-block 31 in FIG. 2, and the screw 43 will hold the V-block downwardly on the base piece in any selected shifted position indicated by the plurality of threaded screw openings 42 in FIG. 2.

FIG. 3 shows the V-block 31 inverted from the FIG. 1 position, and again the V-block side surfaces 38 are in snug sliding relationship with the base piece spaced-apart surfaces 36, as described in connection with FIG. 1. Additionally, the V-block now presents two shoulders 44 downwardly to the base piece shoulders 39, and thus the V-block 31 in the FIG. 3 inverted position is firmly supported upwardly on the base piece. Further, in the FIG. 3 position the smaller V-groove 33 is presented upwardly and thus accommodates the smaller workpiece 28, as shown.

The arrangement of the V-block 31 to be invertible, as described, and the accommodating arrangement of the base piece 10, as described, thus permits the entire vise to accommodate workpieces from say a diameter of one-half inch to a diameter of two inches, and this is achieved in connection with the whole or total displacement of the jaw 22. That is, in the FIG. 1 position, the jaw 22 is shown at its virtual maximum upward position so that the maximum opening is presented between the tip of the jaw 22 and the V-block 31 to thus receive the insertion of the large diameter workpiece 27 and to also clamp downwardly thereon. FIG. 1 further shows the jaw 22 in the dot-dash or lowered position which is in the virtual extreme lowered position comparable to the position it is in FIG. 3 when the block 31 is inverted as shown in FIG. 3, all for accommodating the smaller workpiece 28.

In both instances, the apexes of the V-grooves 32 and 33 always present a plane designated by the line 46 which extends through the apexes of the two V-grooves and which is shown to extend upwardly to the fingers 26 of the jaw 22. The very tips 47 of the jaw fingers 26 extend slightly beyond the plane 46 and thus are available for bearing downwardly on the respective workpieces so that the workpieces cannot escape from their clamped position between the fingertips 47 and the respective V-grooves 32 and 33.

In this context, the base piece 10 has its two spaced-apart and parallel surfaces 36, and the V-block 31 has its four sides, with the first two of the four sides being parallel surfaces 38 in snug sliding contact with the surfaces 36 in either inverted position of the V-block 31. Next, the base piece 10 has its two upwardly facing shoulders 39 faced toward the base piece parallel surfaces 36. Then, the V-block 31 has its two sets of shoulders 41 and 44 which are positioned in alternate bearing contact with the base piece shoulders 39. Further, the V-block 31 has its V-grooves 32 and 33 on another and a second of the two of said four sides of the V-block 31.

The V-block 31 is adjustably secured in the base piece 10 by sliding contact simultaneously with surfaces 36 and hold-down screw 43. The top and bottom of the V-block have a screw head recess.

What is claimed is:

1. A vise having an invertible V-block, comprising a base piece having two spaced-apart and parallel surfaces, a V-block having four sides thereto and with a first two of said four sides which are on opposite sides of said V-block having two spaced-apart and parallel surfaces spaced apart comparable to the spacing of said base piece surface to be in simultaneous snug sliding contact with respective ones of said surfaces of said base piece in both inverted positions of said V-block to have said V-block slidable onto and off from said base piece surfaces, said V-block having a V-groove on each of/-two sides of said four sides where said two sides are on opposite sides of said V-block and intermediate said first two sides and with said V-grooves facing away from each other and with the apex of said V-grooves lying on one common plane parallel to said parallel surfaces of said V-block and with said V-grooves being of two different sizes, said base piece having two shoulders faced toward said base piece parallel surfaces, said V-block having a first set of two shoulders facing in one direction and having a second set of two shoulders facing in a direction opposite said one direction and with said V-block being invertible to have both said sets of said V-block shoulders invertible to be in alternate bearing contact with said base piece two shoulders, all said shoulders of said base piece and said V-block being on respective planes perpendicular to the first-mentioned said plane for support of said V-block on said base piece in the direction of said plane, and a jaw movably mounted on said base piece from a location to one side of the first-mentioned said plane and extending across the first-mentioned said plane and being movable along the first-mentioned plane.

2. The vise having an invertible V-block as claimed in claim 1, including releasable fastener means operably associated with both said base piece and said V-block for holding said V-block onto said base piece.

3. The vise having an invertible V-block as claimed in claim 2, wherein said fastener means is adjustable for adjustably positioning said V-block onto said base piece.

4. The vise having an invertible V-block as claimed in claim 1, wherein one of said two sets of said shoulders on said V-block intersects the larger of said V-grooves and being arranged to have the smaller of said V-grooves disposed extended toward and adjacent said jaw in the smaller V-groove operative position.

5. The vise having an invertible V-block as claimed in claim 1, actuator means on said base piece and operative on said jaw for moving said jaw toward and away from said V-block.

6. A vise having an invertible V-block, comprising a base piece having an opening therein, a V-block having four sides, said base piece and a first two sides of said four sides of said V-block having slidably and mutually snugly engageable surfaces for stabilizing said V-block in said opening on said base piece in both inverted positions, a jaw movably mounted on said base piece for movement toward and away from said V-block, said V-block having V-grooves on the two opposite sides thereof intermediate said first two said sides and with said V-block being invertible for alternately facing said V-grooves toward said jaw upon inversion of said V- block in said opening on said base piece, and said base piece having abutment surfaces faced toward said jaw, and said V-block having a set of abutment surfaces engaged with said abutment surfaces of said base piece in each of the inverted positions of said V-block on said base piece for support of said V-block against movement of said jaw toward said V-block.

7. The vise having an invertible V-block as claimed in claim 6, including releasable fastener means operably associated with both said base piece and said V-block for holding said V-block onto said base piece.

8. The vise having an invertible V-block as claimed in claim 7, wherein said fastener means is adjustable for adjustably positioning said V-block onto said base piece.

9. The vise having an invertible V-block as claimed in claim 6, actuator means on said base piece and operative on said jaw for moving said jaw toward and away from said V-block.

10. The vise having an invertible V-block as claimed in claim 6, wherein said V-block and said base piece engageable surfaces are located on opposite sides of said V-block and are in simultaneous sliding contact, said V-block having a screw opening therethrough and said base piece having a plurality of threaded screw holes in a line parallel to said surfaces for adjustably positioning and holding said V-block on said base piece, and a screw threaded into said screw hole.

11. The vise having in invertible V-block as claimed in claim 10, wherein said screw opening in said V-block is central between said surfaces, and said V-block has a screw head opening at the apex of each of said V-grooves for the countersunk reception of said screw in both inverted positions of said V-block.

12. A vise having an invertible V-block, comprising a base piece, a V-block having four sides, means on said base piece and a first set of two opposite sides of said V-block for restricting movement of said V-block on said base piece in both inverted positions, a jaw movably mounted on said base piece for movement toward and away from said V-block, said V-block having V-grooves on a second set of two of said sides thereof for alternately facing said V-grooves toward said jaw upon inversion of said V-block on said base piece, said base piece having abutment surfaces faced toward said jaw, and said V-block having a set of abutment surfaces engaged with said abutment surfaces of said base piece in each of the inverted positions of said V-block on said base piece for support of said V-block against movement of said jaw toward said V-block.

13. A vise having an invertible V-block, comprising a base piece, a V-block having four sides, said base piece and said V-block having slidably and mutually engageable surfaces for stabilizing said V-block on said base piece in both inverted positions, releasable fastener means operably associated with both said base piece and said V-block for holding said V-block onto said base piece, a jaw movably mounted on said base piece for movement toward and away from said V-block, said V-block having V-grooves on opposite sides thereof for alternately facing said V-grooves toward said jaw upon inversion of said V-block on said base piece, and said base piece having abutment surfaces faced toward said jaw, and said V-block having a set of abutment surfaces engaged with said abutment surfaces of said base piece in each of the inverted positions of said V-block on said base piece.

14. The vise having an invertible V-block as claimed in claim 13, wherein said fastener means is adjustable for adjustably positioning said V-block onto said base piece.

15. A vise having an invertible V-block, comprising a base piece, a V-block having four sides, said base piece and said V-block having slidably and mutually engageable surfaces for stabilizing said V-block on said base piece in both inverted positions, said V-block and said base piece engageable surfaces are located on opposite sides of said V-block and are in simultaneous sliding contact, said V-block having a screw opening therethrough and said base piece having a plurality of threaded screw holes in a line parallel to said surfaces for adjustably positioning and holding said V-block on said base piece, a screw threaded into said screw hole, a jaw movably mounted on said base piece for movement toward and away from said V-block, said V-block having V-grooves on opposite sides thereof for alternately facing said V-grooves toward said jaw upon inversion of said V-block on said base piece, and said base piece having abutment surfaces faced toward said jaw, and said V-block having a set of abutment surfaces engaged with said abutment surfaces of said base piece in each of the inverted positions of said V-block on said base piece.

16. The vise having an invertible V-block as claimed in claim 15, wherein said screw opening in said V-block is central between said surfaces, and said V-block has a screw head opening at the apex of each of said V-grooves for the countersunk reception of said screw in both inverted positions of said V-block.

* * * * *